United States Patent
Osborne et al.

(10) Patent No.: US 6,574,777 B2
(45) Date of Patent: Jun. 3, 2003

(54) DYNAMIC PARITY INVERSION FOR I/O INTERCONNECTS

(75) Inventors: Randy B. Osborne, Beaverton, OR (US); Jasmin Ajanovic, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/023,789

(22) Filed: Dec. 17, 2001

(65) Prior Publication Data

US 2002/0069391 A1 Jun. 6, 2002

Related U.S. Application Data

(62) Division of application No. 09/469,397, filed on Dec. 22, 1999.

(51) Int. Cl.[7] .................. G11B 27/00; H03M 13/00; H04L 7/00
(52) U.S. Cl. ....................... 714/814; 714/775
(58) Field of Search ................. 714/775, 776, 714/814

(56) References Cited

U.S. PATENT DOCUMENTS

| | | | | |
|---|---|---|---|---|
| 3,983,325 A | | 9/1976 | Ollinger et al. ............. 375/369 |
| 4,038,636 A | * | 7/1977 | Doland ........................ 714/775 |
| 4,346,474 A | * | 8/1982 | Sze ............................. 714/802 |
| 4,412,329 A | | 10/1983 | Yarborough, Jr. ............ 714/798 |
| 5,003,535 A | | 3/1991 | May et al. .................... 370/514 |
| 5,282,215 A | | 1/1994 | Hyodo et al. ................ 714/775 |
| 5,570,379 A | * | 10/1996 | Sasaki .......................... 714/775 |
| 5,610,951 A | * | 3/1997 | Higginson ................... 375/364 |
| 5,881,247 A | | 3/1999 | Dombrosky et al. ........ 395/280 |
| 5,996,032 A | | 11/1999 | Baker .......................... 710/62 |
| 6,266,710 B1 | | 7/2001 | Dittmer et al. ............... 710/1 |

FOREIGN PATENT DOCUMENTS

EP 540007 A2 5/1993

OTHER PUBLICATIONS

PCT Written Opinion, PCT/US00/42169, 11 pps.

* cited by examiner

Primary Examiner—Albert Decady
Assistant Examiner—Joseph D. Torres
(74) Attorney, Agent, or Firm—Blakely, Sokoloff, Taylor & Zafman LLP

(57) ABSTRACT

A method of detecting synchronization errors during the transfer of data in which a transmitting agent sends to the receiving agent either: (a) data parity encoded with a data parity function when the transmitting agent encodes data in one or more clock signals, or (b) header parity encoded with a header parity function when the transmitting agent encodes header information in the one or more clock signals. A synchronization error condition is detected when the receiving agent either: (a) is configured to receive the data parity and actually receives the header parity, or (b) is configured to receive the header parity and actually receives the data parity.

6 Claims, 2 Drawing Sheets

DYNAMIC PARITY INVERSION FOR I/O INTERCONNECTS

This is a divisional of application Ser. No. 09/469,397, filed on Dec. 22, 1999 pending.

FIELD OF THE INVENTION

The present invention relates generally to the field of electronic error detection; more particularly, to detecting errors in systems that transfer data and information between agents coupled to a bus, data link, or other type of input/output (I/O) interconnect.

BACKGROUND OF THE INVENTION

Manufacturers of semiconductor devices face constant pressure to reduce the number of interconnects, especially in chipset platforms comprising multiple semiconductor devices interconnected on a common printed circuit board. Since the number of pins is a major factor in the costs of inter-chip connections, it is desirable to make such interconnects fast and narrow. This has led to the development of devices having fewer pins, and pins that can transmit signals very quickly.

One proposal addressing this problem is to utilize a half-duplex bus with distributed arbitration for I/O interconnects designed to connect I/O hubs and peripheral component interface (PCI) bridges (e.g., south bridges) to the memory hub controller (e.g., north bridge). It is well known that in a full-duplex bus, traffic can flow bi-directionally, simultaneously across separate sets of wires. A half-duplex bus is one in which there is a single lane of traffic (i.e., one set of wires) that is shared according to some sort of time-multiplexing scheme.

A common method to achieve synchronization on a half-duplex bus is via a global clock, also frequently referred to as a common or base clock. Each agent coupled to the bus usually has its own associated request signal line (REQ) used to gain ownership of the bus. In the case of synchronization via a global clock, each agent executes the same arbitration algorithm; asserting its request signal to convey its request to a remote agent; sampling the request signal driven by the remote agent; and then choosing which agent to grant ownership to based on the local and remote requests.

In one proposed design an additional control signal is employed for flow control (i.e., a STOP signal), and an additional signal for insuring data integrity (i.e., a PARITY signal). The STOP signal is asserted by the receiving agent to throttle the transmitting agent in cases, for example, such as buffer overflow at the receiving end. The PARITY signal encodes parity for detection of errors in the data signals.

Parity encoding is a well-known technique used to allow a receiving agent to detect an error in the received data. However, parity encoding is limited in detecting mis-synchronization of the agents due to errors in the control signals (e.g., REQ and STOP). This can lead, for instance, to misinterpretation of data as header information, or header information as data. In the situation where data is erroneously interpreted as header information, incorrect data can be written to a wrong address. One example of such a scenario is the STOP signal asserted by the receiving agent going undetected by the transmitting agent, possibly due to a faulty pin, or an intermittent break in the connector. Thus, corruption of the data files can occur before the inconsistency resulting from the original error is detected.

Therefore, what is needed is an error detection scheme for I/O interconnects that can detect mis-synchronization between agents despite possible failures in the control signals.

SUMMARY OF THE INVENTION

The present invention is a method of detecting synchronization errors during the transfer of data across a bus connected to transmitting and receiving agents. In one embodiment, the method comprises sending a first informational element from the transmitting agent to the receiving agent along with first parity signals encoded using a corresponding parity function. The receiving agent then receives the first informational element. The transmitting and receiving agents normally operate synchronously via control signals such that the receiving agent decodes the first parity signals using the corresponding parity function. A synchronization error condition is detected when the receiving agent decodes the first parity signals using a non-corresponding parity function.

BRIEF DESCRIPTION OF THE DRAWINGS

The present invention will be understood more fully from the detailed which follows and from the accompanying drawings, which however, should not be taken to limit the invention to the specific embodiments shown, but are for explanation and understanding only.

DETAILED DESCRIPTION

A system for information transfer and method of operation is described. In the following description, numerous details are set forth, such as specific data sizes, algorithms, signal lines, etc., in order to provide a thorough understanding of the invention. It will be clear, however, to one skilled in the art, that these specific details may not be needed to practice the present invention.

Figure 1:
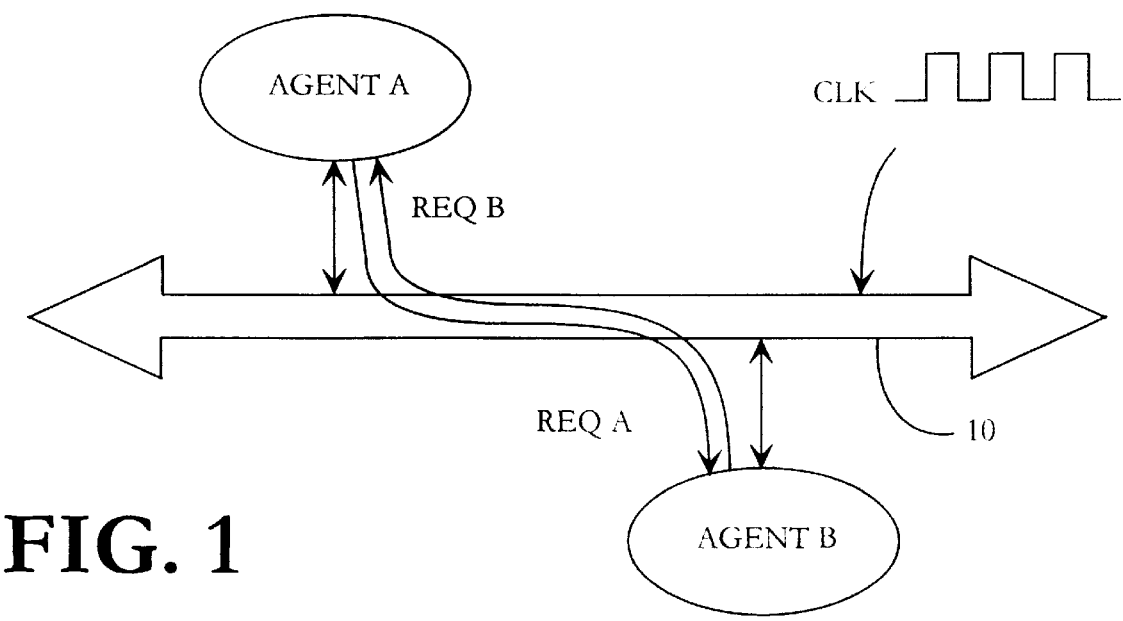
FIG. 1 is a diagram of an interconnect system in which a pair of agents communicates information over a shared bus in accordance with one embodiment of the present invention.

With reference to FIG. 1, there is shown an interconnect system comprising a pair of bus agents (A & B) coupled to a common bus 10. Each agent coupled to the bus executes exactly the same distributed arbitration algorithm. For example, in one embodiment, bus 10 may comprise a half-duplex bus with distributed arbitration both agents monitor their request (REQ) signals to determine if a request signal from a remote agent has arrived. The REQ signals are used by the agents to gain ownership of the bus for transmission of data and information. Operations on bus 10 are synchronized by a common or global clock signal, i.e., CLK.

Figure 2:
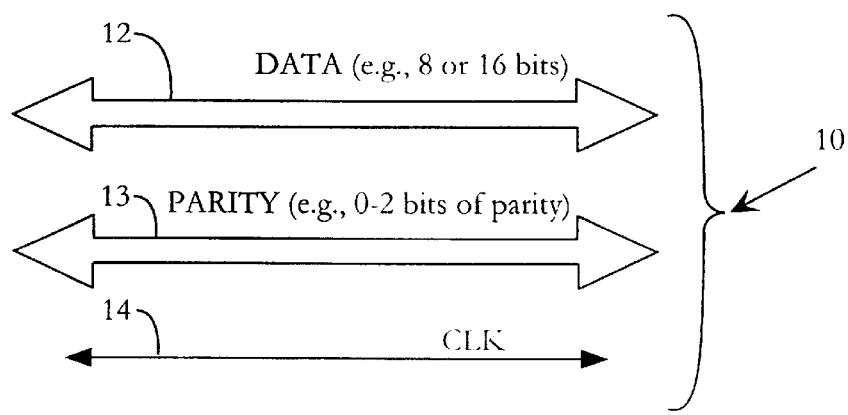
FIG. 2 illustrates the various signal lines, which comprise the shared bus of FIG. 1.

Bus 10 may also include additional control signals for flow control and parity signals for data integrity. The illustration of FIG. 2 shows one possible implementation where bus 10 comprises data signal lines 12, parity signal lines 13 and clock signal line 14. Parity signal lines are a well-known technique for detecting data transmission errors. Typically, a data packet that is sent along the bus is divided into a number of discrete units, each unit fitting within one clock period or pulse. In such cases, parity checking is usually performed every 8 or 16 bits per base clock of data (e.g., 128 bits of data per base clock for a 16-bit wide link).

Although parity checking is an excellent technique for detecting data transmission errors, it is limited in detecting mis-synchronization of the agents due to errors between distributed arbiters. Additional parity on the control lines costs valuable pins. To quickly detect synchronization errors between distributed arbiters, the present invention implements a different parity function depending on the type of information encoded in the base clock.

According to the present invention, when a transmitting agent sends data within the base clock signal, it also sends parity information encoded using a data parity function on the parity signal lines. In the case where the transmitting agent sends header information within a given base clock signal, parity information encoded using a header parity function is sent on the parity signal lines. (Practitioners familiar in the art will appreciate that within each common or base clock, which is used solely for synchronization, there is usually a data clock which runs significantly faster, e.g., $4x$, $8x$, etc.).

Figure 3:
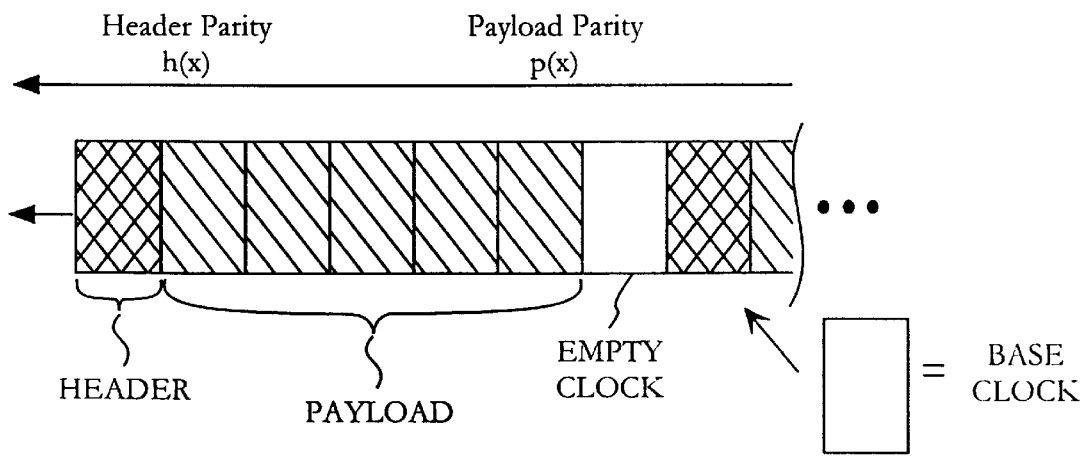
FIG. 3 illustrates a format for transferring information between transmitting and receiving agents in accordance with one embodiment of the present invention.

FIG. 3 illustrates the concept of dynamic parity switching. The diagram of FIG. 3 shows header information being sent on the data lines followed by the actual data, also referred to as the "payload" portion of the transmission. When the transmitting agent sends header information on the data lines, it also sends parity information encoded using the header parity function on the parity signal lines. Conversely, when the transmitting agent sends data on the data signal lines, it also sends parity information encoded using the data parity function on the parity signal lines.

Based on the distributed arbiter and state of the control signals, the receiving agent always knows the type of information it expects to receive in a given base clock. Thus, the receiving agent can track which type of parity function to use for error detection. For example, if the receiving agent expects data in a given base clock, it uses the data parity function to decode the received signals on the parity lines; on the other hand, if the receiving agent expects header information in a base clock, it uses the header parity function.

To indicate the occurrence of a turnaround on the half-duplex bus or link (i.e., data or information flow between transmitter and receiver reverses direction), an empty base clock may be inserted into the transmission flow, as is also shown in FIG. 3.

Dynamically changing the parity function in the above-described manner permits rapid detection of any sources of mis-synchronization between the transmitter and receiver. In effect, the dynamic parity function provides a simple, yet elegant, way to detect errors in control signals. The invention therefore obviates the need to perform complicated protocol checking on control signal lines, such as REQ and STOP. Furthermore, it eliminates the need for additional parity checking (which would require costly pins) on the control signal lines.

One possible way to relate the data parity function and the header parity function is by an inversion. In such an implementation the data parity function is simply the inversion of the header parity function, and vice-versa. Hence, this embodiment of the present invention is referred to as dynamic parity inversion.

Figure 4A:
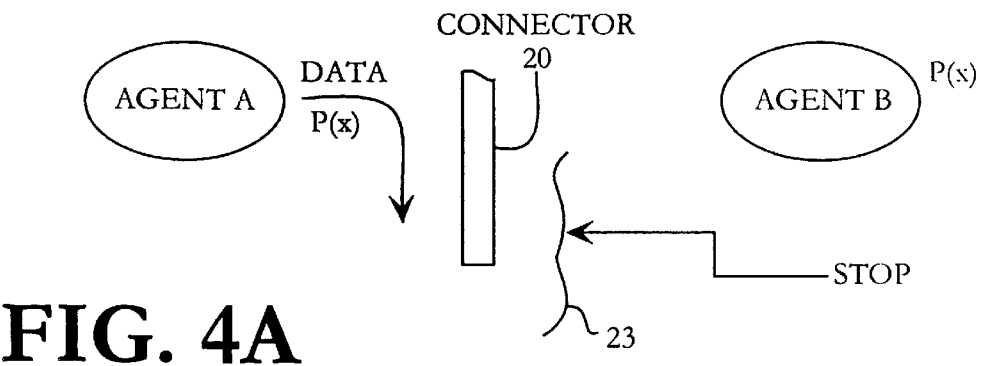
FIGS. 4A & 4B show one possible scenario wherein control signal errors are detected in accordance with one embodiment of the present invention.
Figure 4B:
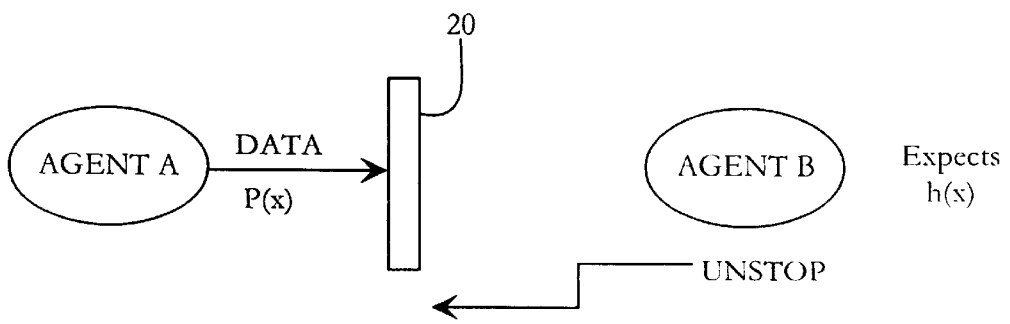

To better understand how the dynamic parity scheme of the present invention is useful in detecting synchronization errors, consider the example depicted in FIGS. 4A & 4B. Assume that a transmitting agent (agent A) is in the process of sending data to a receiving agent (agent B) via I/O connector 20. Further assume that both agents are synchronized; that is, agent A has encoded the data parity function, $p(x)$, and agent B is using the same parity function, i.e., $p(x)$ for decoding purposes. At some point in time, the receiving agent (agent B) signals to the transmitting agent (agent A) that it can no longer accept any more data. Agent B does this by asserting the STOP signal.

Normally, as soon as agent A receives the STOP signal it halts data transmission. However, if agent A never receives the STOP signal—as may occur due to a faulty connection, broken pin, faulty logic, etc. (illustrated by broken line 23 in FIG. 4A)—it will continue to send data across the I/O connector. This data, of course, is never received by agent B and is lost. In other words, agent B is basically turned-off and agent A continues to send data across the link, not knowing that agent B is stopped. Once agent B de-asserts the STOP signal, it may mistakenly interpret the next data sent by agent A as a header (i.e., the data parity might indicate no error). One possible result is that data may be written to a wrong location before some sort of protocol error eventually occurs and operations cease.

FIG. 4B shows the same scenario with dynamic parity. In FIG. 4B, the state of the arbiters is shown immediately after agent B de-asserts the STOP control signal (i.e., unstops the transmission). At this point, the first transmission that agent B expects to receive is a data packet preceded by header information. Therefore, it uses the header parity function, $h(x)$, for decoding the received parity signals. But agent A is continuing to send data along with parity information encoded using the data parity function When agent A decodes the parity signals using the $h(x)$ function, the synchronization error is immediately apparent. Thus, no data is ever written to an incorrect location.

The actual mechanism by which the synchronization error is recognized may vary between different systems. For example, one possibility is to use a simple flag that is set by the code whenever a difference between parity functions is detected.

Practitioners in the art will appreciate that detecting these types of synchronization errors is essential to prevent accidental overwriting of memory with erroneous data. It is further appreciated that the present invention applies to any system in which information transfer between two remote agents is synchronized and both operate in accordance with the same arbitration algorithm.

We claim:

1. A method comprising:
   sending data along with data parity encoded across a bus from a transmitting agent to a receiving agent, the transmitting agent computing the data parity using a data parity function;
   asserting a flow control signal on the bus by the receiving agent, the flow control signal going undetected by the transmitting agent;
   de-asserting the flow control signal, wherein the receiving agent expects to receive a header along with header parity encoded with a header parity function from the transmitting agent thereafter;
   generating a synchronization error signal in response to the transmitting agent continuing to send data along with the data parity encoded with the data parity function across the bus from the transmitting agent to the receiving agent.

2. The method of claim 1 further comprising:
   sending a header along with the header parity across the bus from the transmitting agent to the receiving agent prior to sending the data along with the data parity.

3. The method of claim 2 further comprising:
asserting a request signal by the transmitting agent to gain ownership of the bus prior to sending the header along with the header parity.

4. The method of claim 2 wherein the header parity function comprises an inverse of the data parity function.

5. The method of claim 1 wherein the bus comprises data, parity, and clock signal lines.

6. The method of claim 5 wherein the bus further comprises request and flow control signal lines.

* * * * *